Patented Nov. 17, 1953

2,659,688

UNITED STATES PATENT OFFICE 2,659,688

THALLOPHYTOCIDAL COMPOSITION CONTAINING METAL-HYDRAZINE SALTS AND THE METHOD OF USING THE SAME

Edward C. Soule, Niagara Falls, N. Y., assignor to Mathieson Chemical Corporation, a corporation of Virginia No Drawing. Application December 30, 1950, Serial No. 203,803

10 Claims. (Cl. 167—14)

This invention relates to improved pesticidal agents for the control of destructive thallophytes which include the common molds and fungi as well as the algae which contaminate water supplies and constitute a serious economic problem. More particularly, the invention relates to the control of these troublesome growths by means of compositions containing as an essential ingredient a double salt of a binary inorganic salt with hydrazine or its salts. The double salts are of the metals having atomic numbers of 24 to 30 inclusive which are copper, cobalt, nickel, chromium, zinc, manganese and iron. The halides, particularly the chlorides and bromides, phosphates and the sulfates of these metals may be used with special advantage to form the double salts with hydrazine and its salts which are useful according to the present invention. Various other salts of these metals and of hydrazine may be used. Examples of these double salts follow:

Copper dihydrazinium sulfate,

Copper dihydrazinium chloride,

Nickel tetrahydrazinehydrazinium chloride,

Chromium dihydrazine chloride,

Copper hydrazinium benzoate,

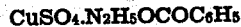

Copper sulfate-hydrazinium bromide,

Copper sulfate hydrazinium phosphate,

Cobalt dihydrazine chloride,

Zinc sesquihydrazine sulfate,

Manganese dihydrazinium sulfate,

Ferrous dihydrazinium sulfate,

Copper sulfate dihydrazinium oxalate,

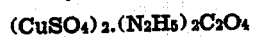

In the control of mildew, molds and algae and other non-chlorophyll containing plants (but excluding the bacteria and more highly organized fungi), there have been no entirely satisfactory control agents. In particular, there has been no satisfactory copper-containing dusting material which is effective and which will not burn the plants. Bordeaux mixture is the most commonly used agent but it suffers from various defects, perhaps the most disadvantageous of which is that it must be used as a spray. Because spray equipment is expensive, it is not possible economically to apply Bordeaux spray satisfactorily except on an extremely large scale. Another disadvantage of Bordeaux mixture is that it fails to control many common diseases of plants due to molds. It also is quickly washed away by rain so that effectiveness may be nullified or cost increased.

In addition elemental sulfur has been used as such and in admixture with other agents for dusting plants in an effort to control diseases due to molds. The use of sulfur is not satisfactory because it is effective only with a relatively few organisms. Furthermore, in hot temperatures sulfur and sulfur-containing compositions tend to burn the plants and this makes the use of sulfur unsatisfactory. This also is a defect of Bordeaux mixture (and other copper containing compositions previously proposed) since some plants are burned thereby at relatively low temperatures. The combination of these copper and sulfur-containing compositions is particularly disadvantageous because the plant is burned at both low and high temperatures.

In the more specific sense, therefore, my invention provides a new type copper-containing thallophyticidic composition of special advantages. In contrast to the unsatisfactory compositions for controlling thallophytes previously known to the art, the copper dihydrazinium sulfate of the present invention is remarkable in that although substantially water insoluble it provides a readily available and effective thallophyticide. Thus it provides insoluble uniform copper dusting compositions. They are highly potent compositions but at the same time produce very little or no burning of the host plants. These results are particularly surprising because of the substantial insolubility of copper dihydrazinium sulfate. For example, the formation of copper dihydrazinium sulfate in particular will remove copper ions from solution and the composition as prepared, when suspended in water, shows no trace of color, usually a peculiarly sensitive test for the presence of copper ions. Copper dihydrazinium sulfate also appears in comprehensive tests at use levels to be completely non-toxic to animals, and fish, so that it has particular value as an algaecide.

The new thallophyticidal compositions in general may be applied by spraying or dusting. They are adhesive and stick well to the plants or other surfaces to be protected, and when compounded in a small proportion with compatible carriers in the form of dusts or sprays, they are without harmful phytotoxic action at the preferred pH. Thus while the thallophyticide agents of the compositions of the present invention are readily prepared in pure form from the component salts, they are unsuitable for use as such and are only employed in the form of solid or liquid compositions in a proportion of about 0.2 to 5 per cent by weight. The balance of the composition is composed of a pesticidal base material which may be insecticidally active or inactive, e. g., free sulfur, inert clays, water or other common carriers and dispersants. With dusting compositions concentrations of about 0.5 to 5 per cent of the active double salts are particularly advantageous. In liquid compositions suitable for spraying or dipping, the double salts are usually in a concentration of about 0.2 to 1 per cent. In mildew-proofing fabrics; e. g. cotton duck for tenting, the thallophyticidal agent may be formed in situ by impregnation with a dilute aqueous solution of the metal salt followed by treatment with an aqueous solution of the hydrazine salt. The insoluble agent thus is precipitated in situ and its concentration is controlled by adjustment of the treating solutions.

It has been found particularly important to control the pH of the diluted compositions and this may be provided directly in the aqueous dilutions by the incorporation in the slurry of suitable proportions of an alkaline agent. For this purpose, lime, caustic, or other compatible base may be used. The double salts, as prepared, when dissolved in water, normally give solutions having a pH of about 4-5 or less, but I have found that the compositions, when diluted, are most effective if the pH is maintained in the range of about 4-8. At lower pH values the host plant is likely to be harmed when the compositions are applied to plants and at more alkaline pH's, decomposition of the double salt occurs with loss of effectiveness.

In the solid compositions designed to be used as dust, sufficient lime or other base as incorporated so that when suspended in water to form a 1 per cent slurry, the aqueous portion will have a pH in the range of 4-8 even though the composition is used as a dust.

The following examples illustrate certain of the specific insecticidal properties and indicate the nature of my compositions, but are not intended as limiting in terms of materials, proportions or applications.

EXAMPLE I

Copper dihydrazinium sulfate having the formula $CuSO_4 \cdot (N_2H_5)_2SO_4$ was prepared by the addition of 1297.6 parts of dihydrazine sulfate with rapid stirring to an aqueous solution of 1996 parts of copper sulfate pentahydrate. The product separated as an extremely fine blue precipitate which was filtered and washed with water and dried. The product is directly useful for spray mixtures or in dusting compositions since over 70 per cent of the powder will pass trough a 400-mesh screen and over 90 per cent will pass through a 325-mesh screen. The product has substantially the composition required by the above formula as shown by the following table:

| Component | Theoretical | Found |
|---|---|---|
| Copper | 19.80 | 19.69 |
| Hydrazine | 19.90 | 18.95 |
| Sulfate | 59.80 | 57.53 |

The fungicidal potency of copper dihydrazinium sulfate was tested against *Sclerotinia fruiticola* by the slide germination technique described in Phytopathology 33, 627-33 (1943). In the blank test 95 per cent of the spores germinated but when 1 p. p. m. of copper dihydrazinium sulfate was added, only 52 per cent of the spores germinated and with 10, 100 or 1000 p. p. m. of the compound no spores germinated. On the basis of these data, the L. D. 50 dose was calculated to be 1.1 p. p. m., a very effective fungicide as compared with other known agents.

Using the same technique, copper dihydrazinium sulfate was tested against *Alternaria oleraceae*. In this test 1 p. p. m. of copper dihydrazinium sulfate reduced the germination to 30 per cent and 10, 100 or 1000 parts completely prevented germination of the spores. The L. D. 50 was 0.4 p. p. m., even better against its organism than the Sclerotinia.

A 5 per cent dust of copper dihydrazinium sulfate with an inactive clay was tested for phytotoxicity by the vacuum duster technique described by Farrar et al., "Journal of Economic Entomology" 41 (4), 647-8 (1949). Observations were made after 3 and 7 days on 7-inch cranberry bean plants, tomato plants and soybean plants with no evidence of any phytotoxic action using a load of 0.3 gram.

The same material was tested against two common algae using 2 p. p. m. of the compound in a suspension of the algae. Satisfactory algaecides will produce a 50 per cent kill in 24 hours and will not permit a rapid increase in the number of cells when observed in 72 hours. Using Pelmellococcus, a green alga, common in rivers and reservoirs which receive some sewage contamination, a suspension of 8.530 million organisms per liter was treated with 2 p. p. m. of copper dihydrazinium sulfate and incubated for 72 hours. When counted after 24 hours, the suspension contained 2.812 million and after 72 hours, 3.913 million organisms per liter. This represents a considerably more than 50 per cent kill and good subsequent control.

Tested in the same way against Nostocacea, an anaerobic blue-green alga very difficult to control, excellent results were obtained. The count dropped from an original value of 345.8 thousand per liter to 136.5 in 24 hours, to 76.4 in 48 hours and rose only to 114.7 thousand per liter in 72 hours.

EXAMPLE II

A cupric dihydrazinium chloride having the formula $CuCl_2 \cdot 2N_2H_5Cl$ was prepared by adding 68.5 grams of hydrazine hydrochloride dissolved in 80 ml. of water to a solution of 85.3 grams of dihydrated cupric chloride in 150 ml. of water. The product appeared as white platelets and a second crop was obtained by evaporation of the mother liquor. The product had a melting point of 176-80° C. It darkened in air but the original white color was restored by heating to about 80° C.

Tested by the spore germination technique, no germination of either Sclerotinia fruiticola or Alternaria oleraceae was obtained with as little as 1 p. p. m. of the compound. This is, therefore, an extremely effective fungicide and better than any other material tested by this method.

When a 5 per cent dust with an inert clay was tested by the technique described in Example I using a 0.3 gram load, the material appeared to be only slightly more phytotoxic than the copper dihydrazinium sulfate previously tested.

In algaecidal tests against Pelmellococcus and Nostocaceae, the organisms used in Example I, excellent results were obtained. With the first organism a count of 8.530 million per liter was reduced in 24 hours to 3.083; in 48 hours to 2.575 and rose in 72 hours to 3.785 million per liter. With the second organism, an original count of 345.8 thousand per liter was reduced in 24 hours to 160.5; in 48 hours to 117.6 and in 72 hours to 87.0 thousand per liter, an outstanding result.

EXAMPLE III

A product approximating the formula $$ZnSO_4.1.5N_2H_4$$

was prepared by adding 85 grams of hydrazine hydrate to 137 grams of zinc sulfate dissolved in 400 ml. of water. A white, finely divided precipitate formed with the evolution of heat and was removed by filtration, washed and dried. The melting point was over 300° C. and the analysis showed 31.21 per cent zinc compared with a theoretical of 31.2 and 22.2 per cent of hydrazine compared with a theoretical value of 22.8.

When 0.1, 0.01 and 0.001 per cent solutions of this material in water were tested as an algaecide against Spirogyra, spirogonium and Mougeotia, the algae showed no more breakdown than in a blank test.

When 2 p. p. m. of the compound was tested against the algae Pelmellococcus by the technique previously described, an original count of 8.530 million per liter was reduced in 24 hours to 3.021; in 48 hours to 2.508 and in 72 hours rose to 6.578 million per liter, a very satisfactory result.

Tested against Nostocaceae in a concentration of 2 p. p. m., an original count of 345.8 thousand per liter was reduced in 24 hours to 84.1; in 48 hours to 110.5 and in 72 hours to 115.3 thousand per liter showing very satisfactory control.

EXAMPLE IV

Zinc dihydrazine chloride, approximating the formula $Zn(N_2H_4)_2Cl_2$ (calculated Zn 32.5%, $N_2H_4$ 31.6%; found Zn 34.3%, $N_2H_4$ 30.0%), was prepared by the addition of 100 grams of hydrazine hydrate to 137 grams of zinc chloride, dissolved in 400 ml. of water. The precipitate was filtered, dried and tested as an algaecide against Vaucheria, Spirogyra, Oedogonium and Lynema at 10, 100 and 1000 parts per million. All were dead after 5 days.

EXAMPLE V

Cobalt dihydrazine chloride tested as a fungicide showed good control of Sclerotinia fruiticola at 100 and 1000 parts per million. Dip tests with 0.1 per cent and 0.25 per cent suspensions showed little or no phytotoxicity to tomato, cranberry bean and broad bean plants.

EXAMPLE VI

Nickel tetrahydrazine hydrazinium chloride at 100 and 1000 parts per million gave good control of Sclerotinia fruiticola. Little or no phytotoxicity to tomato, broad bean and cranberry bean plants was shown in dip tests at 0.1 and 0.25 per cent concentration.

EXAMPLE VII

Chromium dihydrazine chloride gave control of Sclerotinia fruiticola at 100 and 1000 parts per million and showed little or no phytotoxicity to tomato, broad bean and cranberry bean plants in dip tests at 0.1 and 0.25 per cent concentration.

EXAMPLE VIII

A double salt of copper sulfate and hydrazine phosphate was prepared by dissolving 65 grams of dihydrazinium phosphate $(N_2H_4)_2H_3PO_4$ in 190 milliliters of water and adding the solution to a solution of 39.9 grams of anhydrous copper sulfate in 150 milliliters of water. A purple precipitate formed which was filtered off and washed. The yield was 88 grams. The formula was not definitely established but the following table shows the analytical results:

*Analysis of copper sulfate-hydrazinium phosphate*

| Component | Calculated For— | | Found |
|---|---|---|---|
| | $CuSO_4(N_2H_4)_2H_3PO_4$ | $CuSO_4(N_2H_4)H_3PO_4$ | |
| $N_2H_4$ | 19.9 | 11.0 | 10.2 |
| Cu | 19.8 | 22.0 | 23.8 |
| $SO_4$ | 30.5 | 33.8 | 18.2 |
| $H_3PO_4$ | 29.8 | 33.2 | 29.3 |
| | 100.0 | 100.0 | 81.5 |

This compound was tested on seeds to determine its effectiveness against damping off organisms. Pea seeds were admixed with the finely pulverized compound at the rate of one milligram of compound per seed and rolled in a jar for ten to fifteen minutes. The seeds were planted in soil known to be infested with damping off organisms, and the number of plants emerging after seven and fourteen days is counted. With the compound in question, 69% of the seeds sprouted in seven days and 72% in fourteen days. Untreated seeds, under the same conditions, showed 14% emergence in seven days and 15% in fourteen days.

Using steamed soil free from damping off organisms, 84% of the treated seeds emerged in fourteen days whereas untreated seeds showed 89% emergence. Thus the compound has no substantial deleterious effect on the sprouting of the seeds in uncontaminated soil.

This compound was also tested for spore germination, a measure of its effectiveness against fungi. The test is conducted by incubating various dilutions of spores and of the compound being tested in a nutrient medium for twenty-four hours at 20° C. The amount of inhibition is calculated from a count of the spores in the various dilutions and an L. D. 50 dose, the minimum dose in parts per million resulting in 50% inhibition of germination, is also calculated. The L. D. 50 for the copper sulfate hydrazinium phosphate compound was 13 p. p. m. indicating that very low dilutions of the compound are effective in preventing spore germination.

I claim:

1. A composition having thallophyticidal properties which consists essentially of a pulverized solid insecticide carrier and about 0.2 to 5 weight per cent of a double salt of an inorganic salt of a metal having an atomic number within the group 24 to 30 inclusive with one of the group consisting of hydrazine and hydrazine salts and which is characterized by a pH of 4 to 8 when in water dilution.

2. The composition of claim 1 in which the double salt is of copper and hydrazine.

3. The composition of claim 1 in which the double salt is copper dihydrazinium sulfate.

4. The composition of claim 1 in which the double salt is copper hydrazine chloride.

5. The composition of claim 1 in which the double salt is zinc sesquihydrazine sulfate.

6. The composition of claim 1 in which the double salt is zinc hydrazine chloride.

7. The composition of claim 1 in which the double salt is copper sulfate hydrazinium phosphate.

8. The composition of claim 1 in which the pesticidal base material is clay and in which the double salt is copper dihydrazinium sulfate.

9. The method of controlling thallophytes which comprises applying to the material to be protected a composition which consists essentially of clay and about 0.2 to 5 weight per cent of copper dihydrazinium sulfate, and which is characterized by a pH of about 4 to 8 when in water dilution.

10. The method of controlling thallophytes which comprises applying to a material subject to attack by thallophytes a composition consisting essentially of a pulverized solid insecticide carrier and about 0.2 to 5 weight per cent of a double salt of an inorganic salt of a metal having an atomic number within the group 24 to 30 inclusive with one of the group consisting of hydrazine and hydrazine salts and which is characterized by a pH of 4 to 8 when in water dilution.

EDWARD C. SOULE.

References Cited in the file of this patent

UNITED STATES PATENTS

| Number | Name | Date |
|---|---|---|
| 1,880,516 | Stauf et al. | Oct. 4, 1932 |
| 1,892,728 | Hagenest et al. | Jan. 3, 1933 |
| 2,051,910 | Sessions | Aug. 25, 1936 |
| 2,104,754 | Marsh et al. | Jan. 11, 1938 |

OTHER REFERENCES

Iredale et al.: J. Chem. Soc. (1930), pages 395 to 397.